United States Patent
Paulsen et al.

(10) Patent No.: US 11,080,732 B2
(45) Date of Patent: Aug. 3, 2021

(54) AUDIENCE COMPARISON

(71) Applicant: ADOBE INC., San Jose, CA (US)

(72) Inventors: Trevor Paulsen, Lehi, UT (US); Craig Mathis, American Fork, UT (US); Nikolaos Vlassis, San Jose, CA (US); Branislav Kveton, San Jose, CA (US); Kristopher Paries, Murray, UT (US); Ivan Andrus, Saratoga Springs, UT (US); Hung Bui, Sunnyvale, CA (US); Michael Rimer, Saratoga Springs, UT (US)

(73) Assignee: ADOBE INC., San Jose, CA (US)

( * ) Notice: Subject to any disclaimer, the term of this patent is extended or adjusted under 35 U.S.C. 154(b) by 1022 days.

(21) Appl. No.: 15/180,582

(22) Filed: Jun. 13, 2016

(65) Prior Publication Data

US 2017/0357988 A1 Dec. 14, 2017

(51) Int. Cl.
*G06Q 30/02* (2012.01)
*G06F 3/0484* (2013.01)

(52) U.S. Cl.
CPC ....... *G06Q 30/0204* (2013.01); *G06F 3/0484* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,009,082 B1* | 4/2015 | Marshall | ............ | G06Q 30/0601 705/500 |
| 9,262,470 B1* | 2/2016 | Evans | ................ | G06Q 30/0255 |
| 2009/0063268 A1* | 3/2009 | Burgess | ................ | G06Q 30/02 705/14.39 |
| 2015/0081389 A1* | 3/2015 | Dereszynski | ...... | G06Q 30/0204 705/7.33 |
| 2016/0171514 A1* | 6/2016 | Frank | ..................... | G06Q 30/02 705/7.29 |
| 2016/0314491 A1* | 10/2016 | Shani | ................. | G06Q 30/0275 |
| 2017/0140416 A1* | 5/2017 | Ye | ....................... | G06Q 30/0243 |
| 2017/0309094 A1* | 10/2017 | Farahat | ................. | G06Q 10/06 |

OTHER PUBLICATIONS

Scholz, et al., "K-Sample Anderson-Darling Tests", Journal of the American Statistical Association, vol. 82, No. 399 (Sep. 1987), pp. 918-924.

* cited by examiner

*Primary Examiner* — Chrystina E Zelaskiewicz
(74) *Attorney, Agent, or Firm* — F. Chau & Associates, LLC

(57) ABSTRACT

Systems and methods are disclosed herein for providing a user interface representing differences between segments of end users. The systems and methods receive user input on a user interface identifying a first segment, the first segment being a subset of the end users having a particular characteristic, determine differences between the first segment and a second segment, and represent, on the user interface, the differences between the first segment and the second segment based on relative significances of the differences. The marketer using the user interface is able to quickly and easily identify the metrics, dimensions, and/or relationships to other segments that most distinguish the compared segments from one another.

12 Claims, 14 Drawing Sheets

AUDIENCE COMPARISON

TECHNICAL FIELD

This disclosure relates generally to computer-implemented methods and systems and more particularly relates to improving the efficiency and effectiveness of computing systems used to distribute electronic content and compare segments of end users accessing electronic content via computer networks such as the Internet.

BACKGROUND

Information is collected about end users, people who use or who may someday use an electronic device such as a computer, tablet, or cell phone to execute a web browser, use a search engine, use a social media application, or otherwise use the electronic device to access electronic content via an electronic network such as the Internet. Some end users execute web browsers, search engines, social media applications, and other computer tools to access electronic content through the Internet. Such content is often provided along with targeted promotional materials. In one example, an end user is presented with a promotion for a retail item when the end user accesses a particular webpage or initiates a search engine search using a particular keyword. The promotion is often targeted, for example, having been selected based on the webpage, the keyword, and/or the end user's identity or other end user information, e.g., based on an item on a wish list associated with his online shopping account with an online retailer.

Promotional content is often targeted by segmenting end users into specific segments. A "segment," as the term is used herein, is a set of end users or end user data defined by one or more identified characteristics. For example, one marketer defines a segment of end users who have more than two orders and defines another segment of end users who have visited a sports sections of the marketer's web site. The marketer tracks segment-specific end user interaction data (e.g., clicks, requests, purchases, etc.) and sends targeted marketing to particular segments.

Electronic systems used to help marketers define segments, track segments, and market to segments face numerous difficulties. Marketers have a tendency to define many, many different segments because, among other things, of the marketers having numerous and varying business objectives. It is often difficult for a marketer to distinguish between his defined segments and understand how the segments differ from one another. Moreover, segments are often defined arbitrarily based on intuition and gut feelings without any way for a marketer to determine whether the segment is actually providing a useful division of end users. Existing systems provide little or no feedback regarding the statistical uniqueness of a segment or any way for a marketer to understand how one segment compares to another segment in terms of providing a meaningful division of end users with respect to particular attributes. For example, a marketer may define a segment of end users having more than one order and have no way of identifying what else about that segment is unique, i.e., what else about those end users or what those end users are doing is different from everyone else other than that those end users that have more than one order.

Existing marketing systems that assist marketers with segmenting end users also face challenges unique to the Internet computing environment. Unlike in the context of paper-based advertising in which customer information was limited in nature, e.g., generally including a relatively small set of data about each end user's name, contact information, prior purchase history, preferences, in the context of Internet communications and interactions, the types and volumes of end user data are orders of magnitudes larger. The various metrics, dimensions, and segments for a end user in the Internet context are generally so large in number and unwieldy that manual comparison is infeasible, if not impossible. Existing systems that assist marketers with segmenting end users have not provided segment differentiating information, segment comparison information, and have not provided feasible techniques for processing large volumes of segment data to provide such information in an efficient and timely manner.

SUMMARY

Systems and methods are disclosed herein for providing a user interface representing differences between segments of end users. The systems and methods receive user input on a user interface identifying a first segment, the first segment being a subset of the end users having a particular characteristic, determine differences between the first segment and a second segment, and represent, on the user interface, the differences between the first segment and the second segment based on relative significances of the differences. A marketer using the user interface is able to quickly and easily identify the metrics, dimensions, and/or overlaps with other segments that most distinguish the compared segments from one another.

Another embodiment of the invention allows more efficient and effective comparison of segments. Systems and methods of this embodiment of the invention identify a first segment and a second segment and randomly assign end users into either a first category and a second category. Non-overlapping subsets of end users are selected from the first segment and the second segment by selecting a first subset of first segment end users in the first category and selecting a second subset of second segment end users in the second category. The use of the categories thus ensures that the selected subsets will not overlap. The subsets can then be compared to compare the segments. In one example, the systems and methods determine relative differences between the subsets, and present differences between the segments based on the differences between the subsets.

The user interfaces used to present differences between segments are further used to facilitate targeted marketing in one embodiment of the invention. In one example, the user interface receives a selection of one of the compared segments (i.e., of the first segment or second segment), and based on the selection, an online ad is presented through a computing network to end users in the selected segment. A marketer is thus able to easily identify segment differences and coordinate his or her targeting efforts based on observing those differences.

Another embodiment of the invention provides systems and methods for providing a user interface that more quickly presents significant differences between segments of end users. The systems and methods of this embodiment receive user input identifying a first segment and identify relatively greater differences and relatively smaller differences between the first segment and a second segment based on determining differences in a sampled subset of a complete data set. The systems and methods then determine and present statistical results for the relatively greater differences using the complete data set before determining statistical results for the relatively smaller differences in the complete data set. In this way, the user interface is able to provide relevant results more quickly than if the complete data set is analyzed for all differences before any results are presented.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

FIG. 4 illustrates an examples of a user interface of a system providing segment differentiating and comparison information to a marketer.

FIG. 5 illustrates an examples of a user interface of a system providing segment differentiating and comparison information to a marketer.

DETAILED DESCRIPTION

Figure 1:
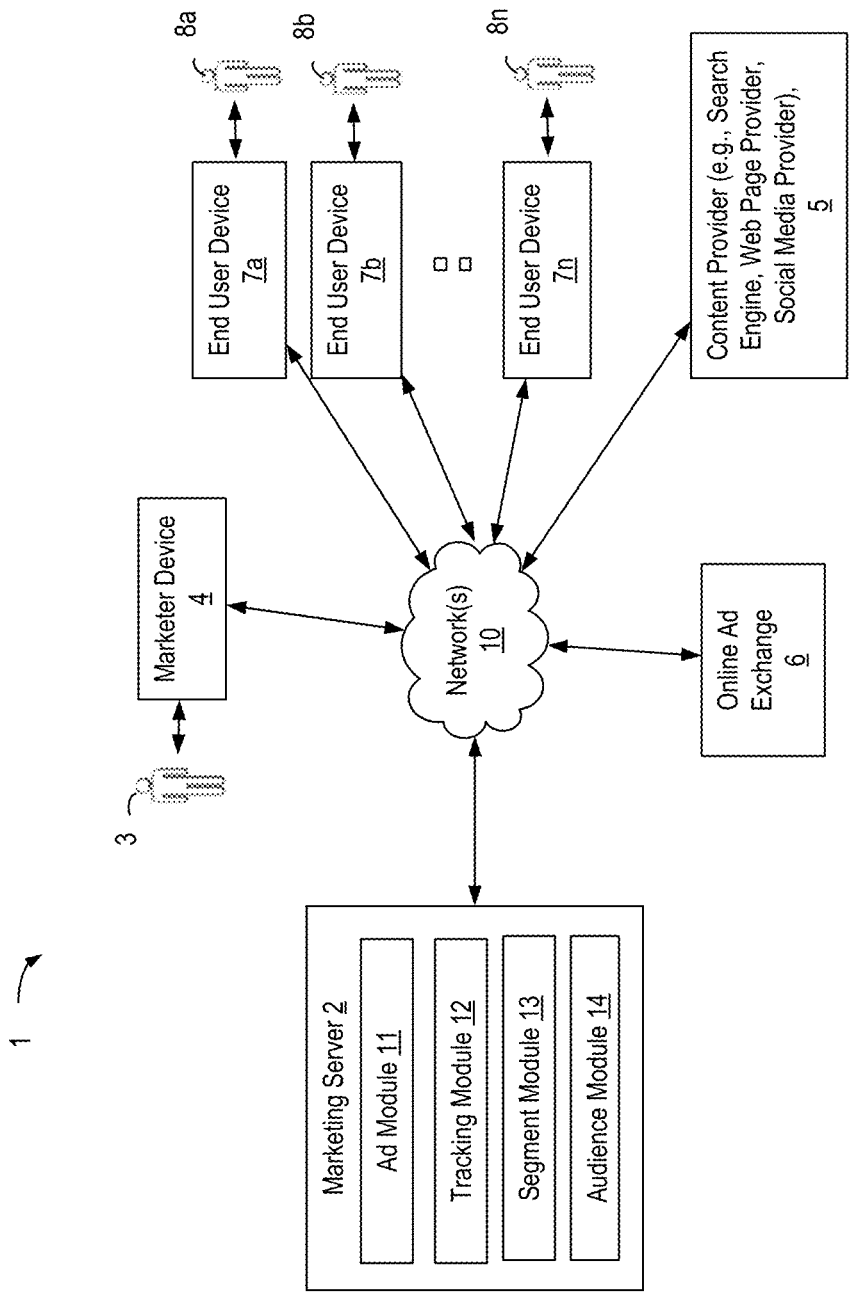
FIG. 1 illustrates an exemplary computer network environment in which an exemplary system for providing user interfaces with segment differentiating and comparison information and for distributing online ads.

As described above, existing systems that assist marketers with segmenting end users have not provided adequate information differentiating and comparing segments, and have not provided feasible techniques for processing large volumes of segment data to provide such information in an efficient and timely manner. The invention, among other things, provides one or more features that address these deficiencies. One aspect of the invention provides a user interface that represents differences between segments of end users based on the relative significance of the differences. For example, in one embodiment, differences between the segments with respect to various metrics (e.g., age, income, revenue, number of visits, number of videos watched, etc.) are identified, scored, and presented in an order based on the relative scores. In this example, the marketer is able to easily see on the user interface the metrics with respect to which the segments differ most, and by how much they differ.

As a more specific example, a marketer compares a platinum member segment with a gold member segment and is able to see that the segments differ most with respect to a "number of videos watched" metric and that the difference in this metric between the segments is significant. Based on an understanding of this metric, the marketer takes an appropriate action, for example, sending a video-targeted online ad only to the platinum member segment end users based on understanding that this segment will respond better to those types of online ads than the gold member segment end users.

Segments are compared with respect to metrics, dimensions, and/or overlap with other segments. By presenting a user interface that represents such differences between segments based on the relative significance of the differences, the system allows a marketer to more easily and accurately understand data and statistics-based information about how well a segment differentiates end users and compares to other segments.

One or more other embodiments of the invention facilitate efficient and accurate comparison of segment data in the circumstance in which there is some segment overlap, i.e., in which some end users are in both segments that are being compared with one another. For example, in one embodiment of the invention, a striping technique is used to eliminate the overlap for the comparison tests and still allow the tests to provide statistically-valid results. In this example, end users are randomly assigned into either a first category or a second category and then non-overlapping subsets of end users from the first segment and the second segment are selected. The technique ensures that the subsets do not overlap by selecting the first subset of first segment end users in the first category and selecting the second subset of second segment end users in the second category. Because the subsets come from different categories, which do not overlap, the subsets do not themselves overlap. Once the subsets are identified, relative differences between the subsets are determined and presented, and the marketer is able to better determine to provide an online ad based on knowing the relative differences between on the first segment and the second segment.

One or more other embodiments of the invention facilitate efficient and accurate presentation of segment comparison information based on sampling a subset of the complete segment dataset. To collect the segment comparison information, numerous aspects (metrics, dimensions, and/or overlap with other segments) is computed. Selectively processing data that will be presented first based on sampling speeds up the presentation of relevant information to the marketer. In an embodiment of the invention in which the user interface will present the most significant differences first, relatively greater differences are identified between the first segment and a second segment based on determining differences in sampled subsets of the complete data set. For example, the technique determines that "number of videos watched" is the metric with respect to which platinum members differ most from gold members based on assessing only a sample of the data for each of the metrics. Enough sample data is used to ensure an accurate ranking of metric differences between the segments. Once the greatest differences between the segments are identified, the system processes and displays information about those aspects using the complete data sets before processing other aspects for the complete data sets. In this way, the system is able to display the most relevant segment data on the user interface more quickly than it otherwise would if it attempted to process the complete data sets for all aspects before ranking and displaying results on the user interface. This improved efficiency and speed is especially advantageous for systems that collect very large amounts of Internet end user interaction data.

As used herein, the phrase "electronic content" refers to any content in an electronic communication such as a web page or e-mail accessed by, or made available to, one or more individuals through a computer network such as the Internet. Examples of electronic content include, but are not limited to, images, text, graphics, sound, and/or video incorporated into a web page, search engine result, or social media content on a social media app or web page.

As used herein, the phrase "end user" refers to any person who uses or who may someday use an electronic device such as a computer, tablet, or cell phone to execute a web browser, use a search engine, use a social media application, or otherwise use the electronic device to access electronic content via an electronic network such as the Internet. Accordingly, the phrase "end user" includes any person that data is collected about via electronic devices, in-store interactions, and any other electronic and real world sources. Some, but not necessarily all, end users access and interact with electronic content received through electronic networks such as the Internet. Some, but not necessarily all, end users access and interact with online ads received through electronic networks such as the Internet. Marketers send some end users online ads to advertise products and services using electronic networks such as the Internet.

As used herein, the phrase "segment" refers to a set of end users or end user data defined by one or more identified characteristics. For example, all end users who have made at least two online purchases is a segment and all end users who are platinum reward club members is another segment. Within a given population of end users, segments can entirely or partially overlap with one another. In the above example, some end users who have made at least two online purchases are also platinum reward club members, and thus those segments partially overlap with one another.

As used herein the phrase "marketer" refers to a person or entity that sends online ads or otherwise creates and/or implements a marketing campaign to market to end users.

As used herein, the phrase "metric" refers to numeric information about one or more end users or segment including, but not limited to, age, income, number of televisions click-through rate, view-through rate, number of videos watched, conversion rate, revenue, revenue per thousand impressions ("RPM"), where revenue refers to any metric of interest that is trackable, e.g., measured in dollars, clicks, number of accounts opened and so on. Generally, metrics provide an order, e.g., one revenue value is greater than another revenue value which is greater than a third revenue value and so on.

As used herein, the phrase "dimension" refers to non-numerically-ordered information about one or more end users or segments, including, but not limited to page name, page uniform resource locator (URL), site section, product name, and so on. Dimensions are generally not ordered and can have any number of unique values. Dimensions will often have matching values for different end users. For example, a state dimensions will have the value "California" for many end users. In some instances, dimensions have multiple values for each end user. For example, a URL dimension identifies multiple URLs for each end user in a segment.

As used herein, the phrase "online ad" refers to an item that promotes an idea, product, or service that is provided electronically in or with a web page, social media, keyword search result, e-mail, or other electronic communication sent, accessed by, or made available to one or more end users through a computer network such as the Internet. Examples of online ads include, but are not limited to, images, text, graphics, sound, and/or video incorporated into a web page, search engine result, or social media content on a social media app or web page that advertise or otherwise promote or sell something, usually a business's product or service.

FIG. 1 illustrates an exemplary computer network environment in which an exemplary system for providing user interfaces with segment differentiating and comparison information and for distributing online ads. The exemplary computer network environment 1 includes a marketer server 2, a marketer device 4, a content provider 5, an online ad exchange 6, and end user devices 7a-n. End user device 7a-n are used by end users 8a-n to access electronic content via network 10 from content providers such as content provider 5. A marketer 3 implements a marketing campaign to distribute online ads along with the content that is obtained by the end users 8a-n and viewed (or experienced) on end user devices 7a-n. For example, marketer 3 uses marketer device 4 to create several online ads and specifies a marketing campaign that is ultimately used to determine how a marketing campaign budget will be used to pay for placement of the online ads with the electronic content obtained by the end users 8a-n. Some or all of the online ads are placed by bidding on online ad opportunities offered by online ad exchange 6, for providing online ads with electronic content, for example, electronic content provided by content provider 5.

The marketing server 2 includes an ad module 11, a tracking module 12, a segment module 13, and an audience module 14. In this exemplary system, the marketer 3 uses marketing device 4 to interact with a user interface and/or other marketing features provided by marketing server 2. The marketer 3 uses the ad module 11 to create and/or distribute online ads to end users 8a-8n. The marketer uses the tracking module 12 to track information and/or interaction data regarding end users 8a-n. For example, online ads distributed by the ad module 11 and sent to end user devices 7a-n include tracking functionality that facilitates tracking of interactions with those online ads. In one example, online ad content is configured with code or other functionality that causes messages to be sent when the user clicks on particular content items, spends time with a particular online ad, conducts a particular conversion activity after using an online ad, etc. The messages are sent to the tracking module 12 (or to another tracking device) and ultimately used to compile analytics information about end user 8a-n interactions with online ads.

The segment module 13 allows the marketer 3 to define segments of end users. For example, a marketer defines three segment as end users under age 25, end users age 25-39, and end users age 40 and older. The marketer 3 is then able to review segments specific-information about the segments including metrics, dimensions, and how the end users in the defined segments relate to other segments. For example, the marketer 3 is able to see that end users in the under 25 segment convert 10% of the time after interacting with a social media online ad, whereas end users in the other two segments only convert 3% and 4% and the time respectively after interacting with a social media ad. Similarly, the marketer 3 is able to see how the three segments relate to other segments, for example, seeing that 20% of end users in the under 25 year-old segment are platinum members, 40% of the end users in the 25-39 year old segment are platinum members, and that 60% of the end users in the over 40 year old segment are platinum members. In addition to seeing segment specific information, the marketer 3 is able to target particular segments with online ads, for example, sending a particular ad via social media to only the segment of end users age 25 and younger.

The audience module 14 of marketing server 2 further enhances the marketer 3 ability to understand, compare, and understand segments. In one embodiment of the invention, the audience module allows the marketer 3 to select segments to compare and then view a user interface that prioritizes and presents information in a way that facilitates the marketer 3 understanding the significant differences between the segments and otherwise compare the segments. For example, the marketer 3 selects a segment of end users that have more than two orders and to compare those end users with everyone else or compare platinum members to gold members.

The audience module 14 allows the marketer 3 analyze segments that he or she interested in understanding more about. Audience module 14 dynamically scan through all metrics, dimensions, and/or other segments that the marketer 3 has access to and finds what makes the segment unique and distinctive. With respect to metrics (numeric information about one or more end users or segments), the audience module 14 scans through all of the different metrics and finds the most significant differences. For example, the audience module 14 compares a platinum segment of end users with a gold segment of end users and determines that the platinum member revenue distribution and the gold member revenue distribution differ significantly from one another. The audience module does a similar comparison for all other metrics and determines which of the metrics have the most significant differences between the compared segments. The comparison can involve more than a simple comparison of averages. In the above revenue example, the distribution curves are statistically compared to determine differences.

The audience module 14 also compares dimensions of non-numerically-ordered information about one or more end users or segments. In one example, dimensions are analyzed to identify frequently occurring values. For example, if the dimension is the URL of the webpage of the content with which online ads are provided to end users, particular URL's may occur quite frequently for one segment but not for another. As another example, the audience module determines that segment A end users are far more likely to be from Japan than segment B end users. In these examples, the dimensions are treated as categories with non-ordinal information for which frequency of occurrence is used to compare segments.

The audience module 14 also compares the other segments that compared segments overlap. For example, audience module 14 compares segment A and segment B with other segments C-Z and determines that segment A overlaps with segment G significantly but that segment B does not overlap with segment G very much at all. This significant difference in overlap is identified for the marketer 3. In one example, user interface provided by audience module 14 identifies the other segments with which the overlap differences are greatest and/or the other segments with which the overlap differences are the least.

The audience module 14 automatically compares metric, dimension, and other segment overlap information to provide useful, prioritized, and relevant information to the marketer 3. In many circumstances, the large volume of segments and end user metric and dimension data present in the context of the Internet would make manually comparing and understanding the significant differences between segments infeasible or impossible. Accordingly, aspects of the invention address Internet-centric issues. In one embodiment, a marketer views one or more ranked lists of the differences in metrics, dimensions, and other segment overlap between two or more segments that are being compared. The focus of the user interface on the most significant differences allows the marketer 3 to easily understand key differences and drill down for details where needed and ultimately make better, more informed marketing strategic decisions.

Figure 2:
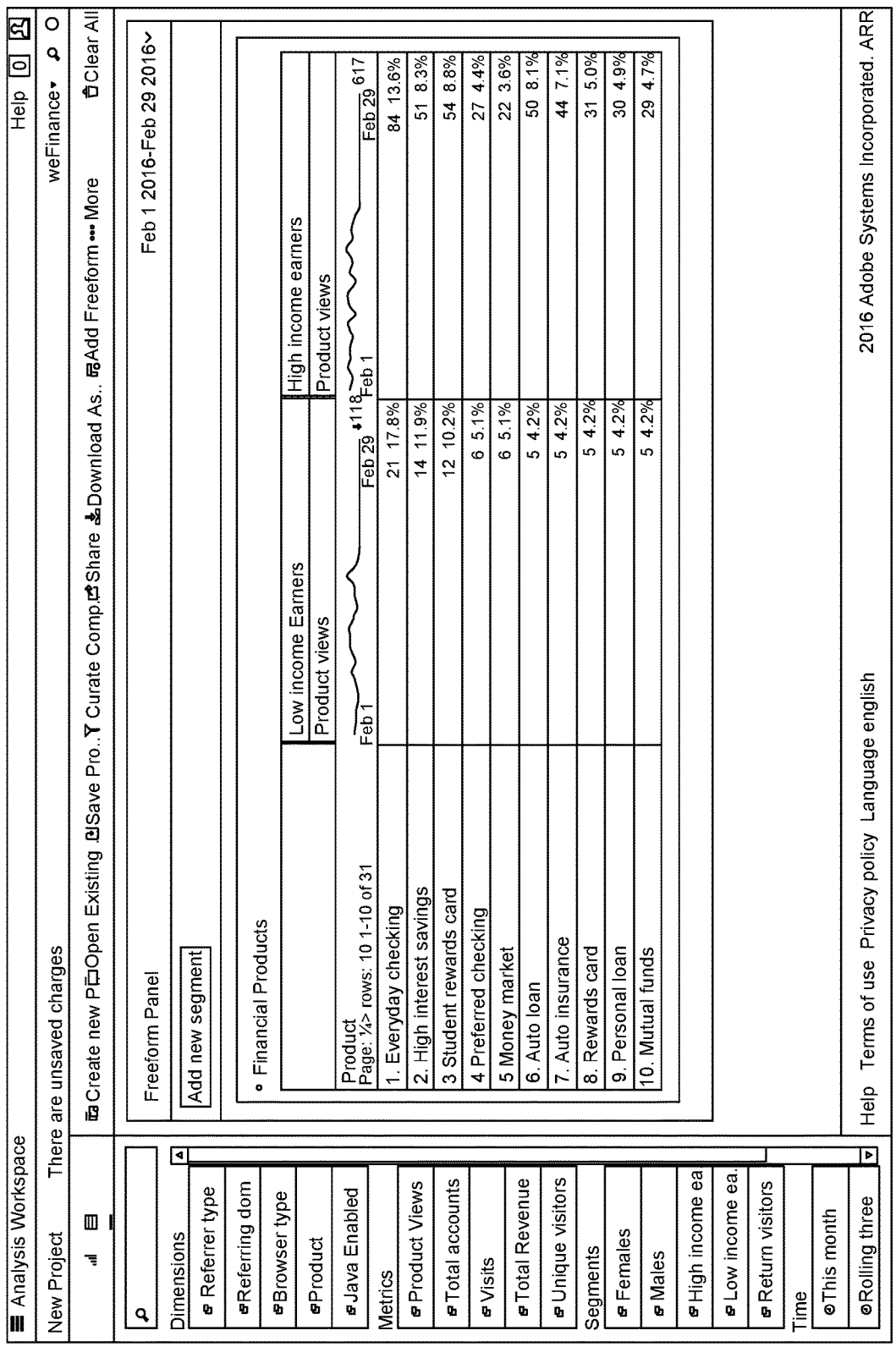
FIG. 2 illustrates an example of a user interface requiring manual comparison of segment data.

FIG. 2 illustrates the difficulty in comparing segments manually. Segmentation has become a powerful tool for analyzing marketing effectiveness. However, as companies create more and more segments, it's becoming increasingly difficult to understand why one segment is more important than another and what makes it unique or different. In this example, the marketer has defined a high-income segment and a low-income segment and displays the segments as part of a products report in a table. Scanning the table, a marketer might identify that auto loans is being viewed more frequently by high-income earners than low income earners. Even if this difference is identified, it is just one metric with an apparently significant difference. The marketer does not know if the segments differ significantly with respect to other metrics, dimensions, and other segment overlap. Manually comparing and identifying such significant differences in the context of large numbers of segments, metrics, and dimensions is infeasible or impossible.

Figure 3:
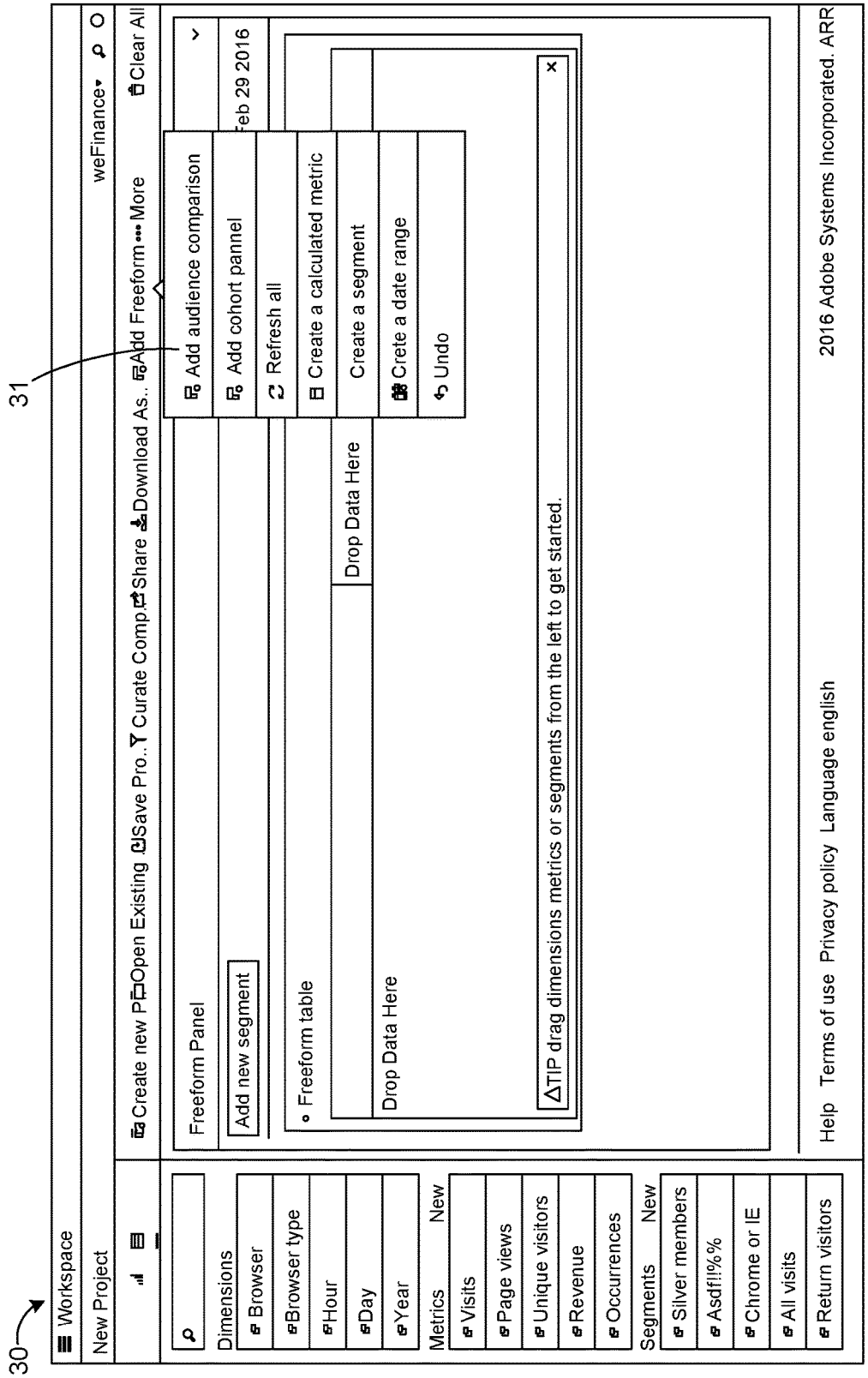
FIG. 3 illustrates an examples of a user interface of a system providing segment differentiating and comparison information to a marketer.
Figure 4:
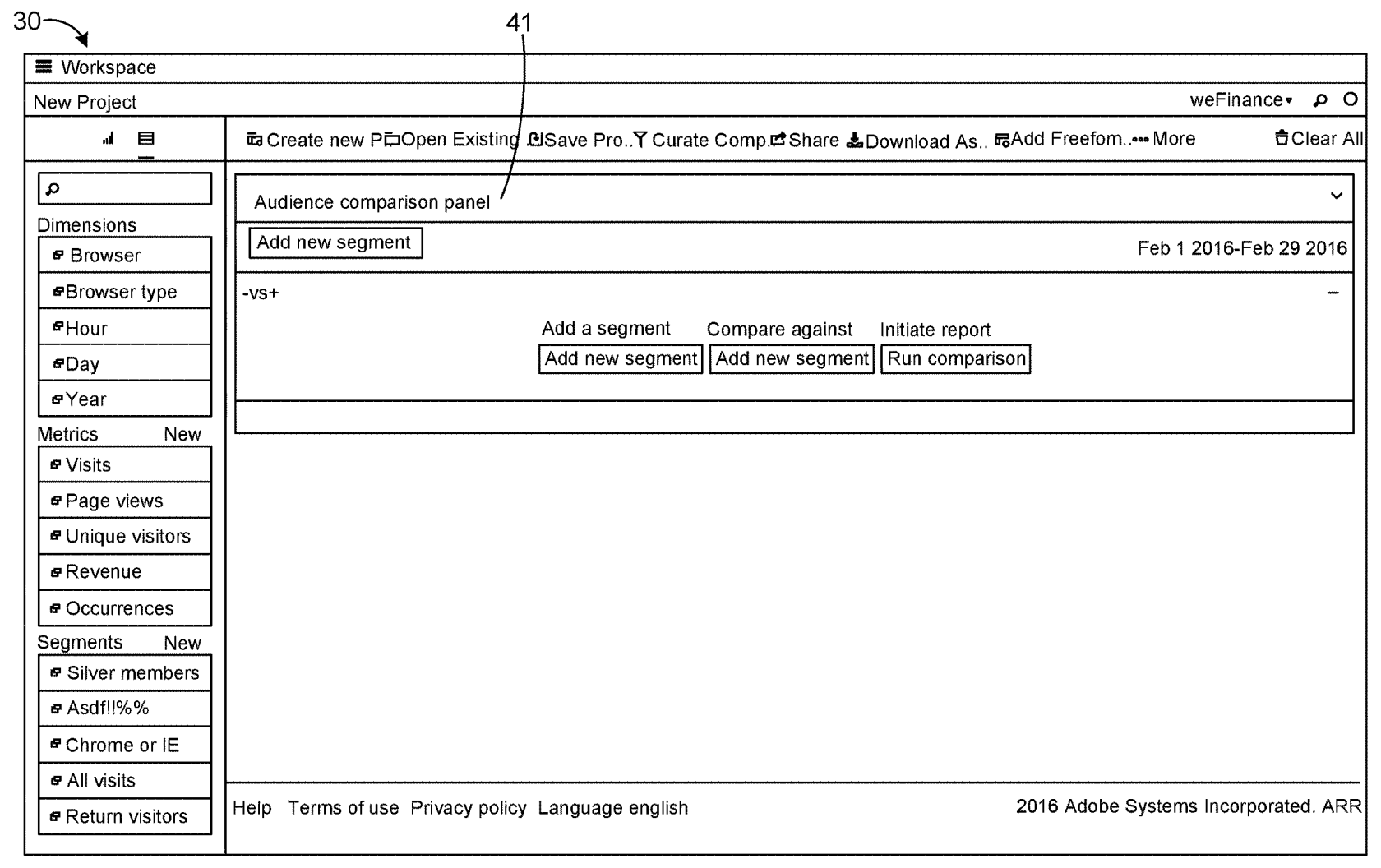
Figure 5:
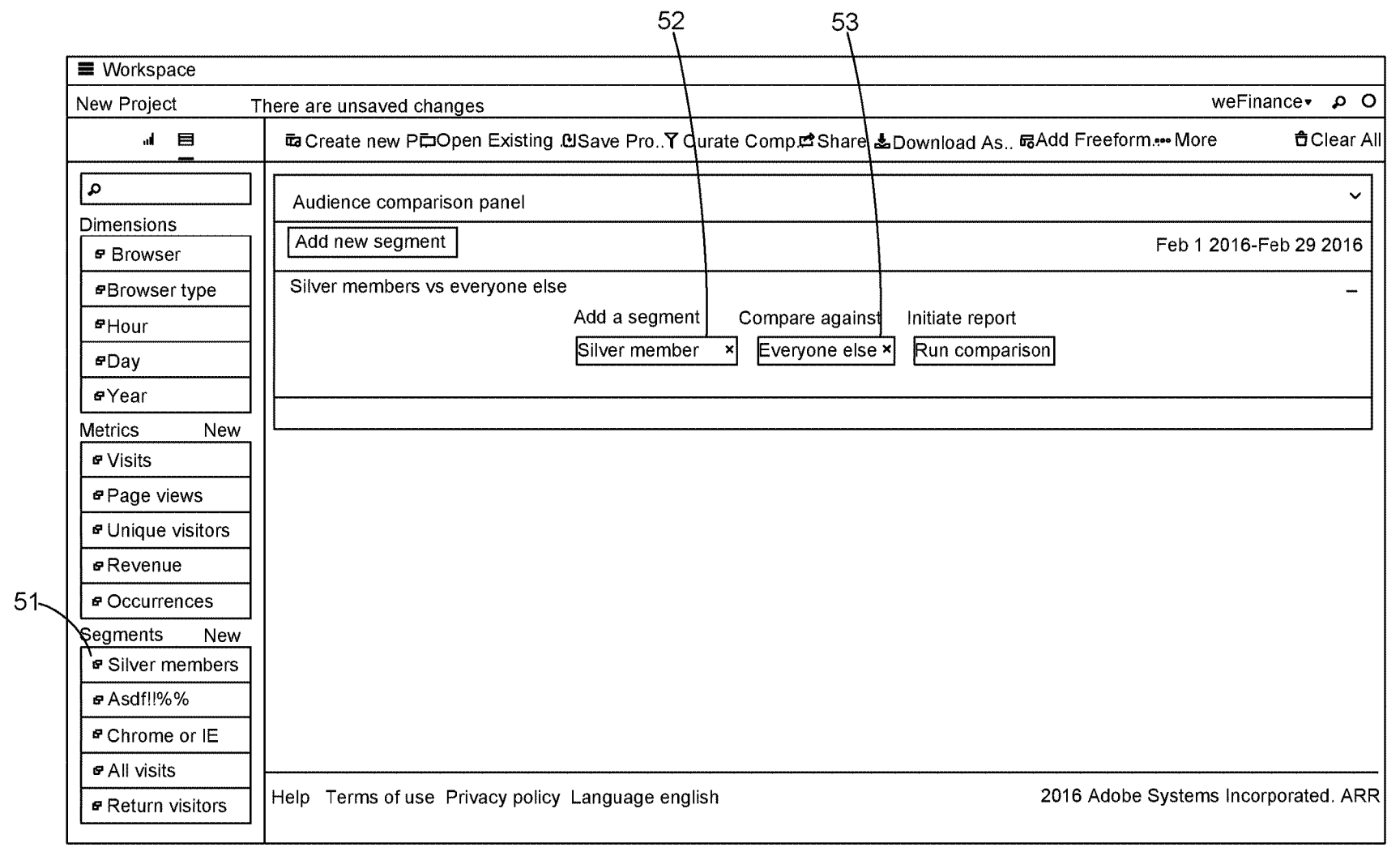
Figure 6:
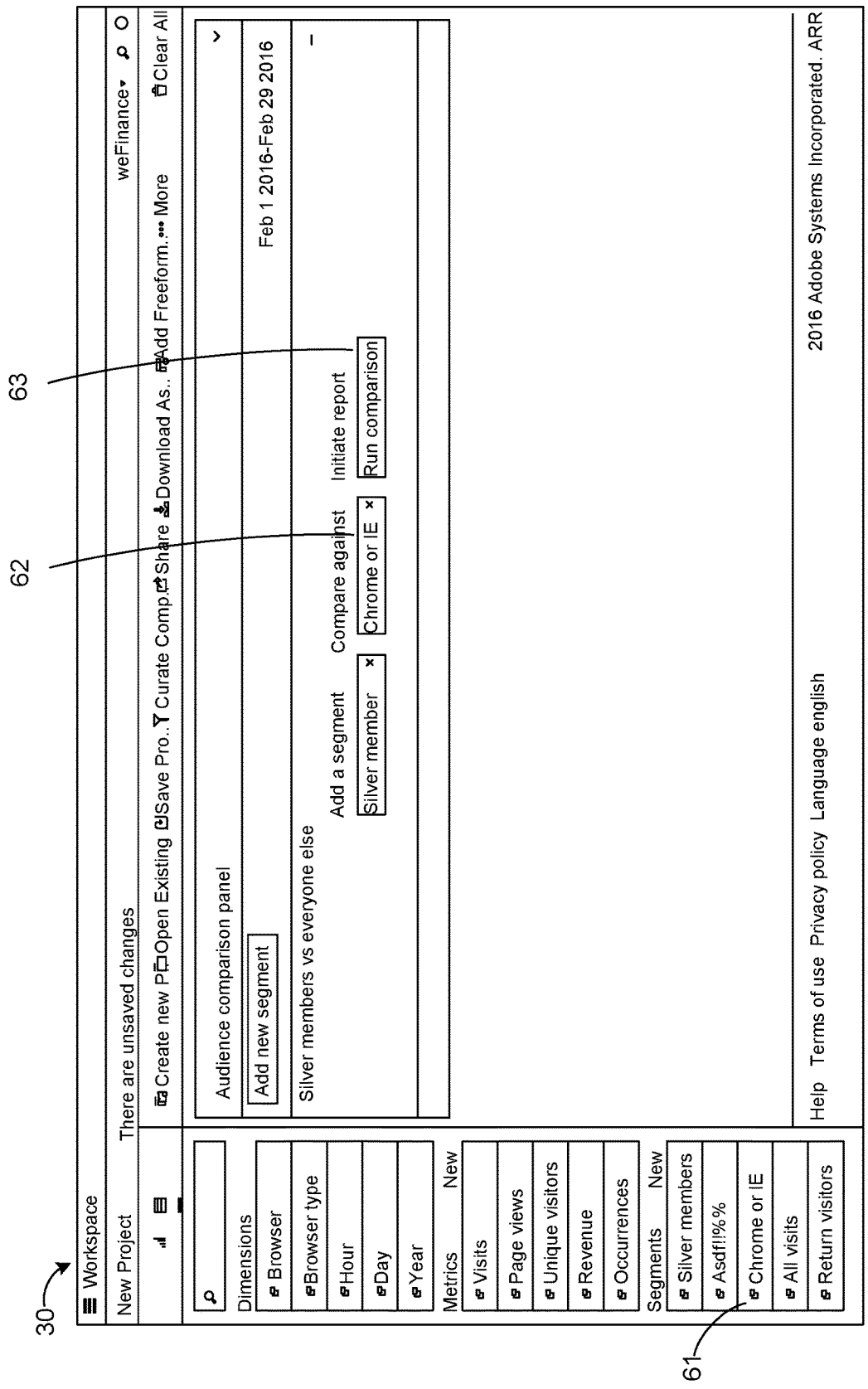
FIG. 6 illustrates an examples of a user interface of a system providing segment differentiating and comparison information to a marketer.

FIGS. 3-8 illustrate examples of a user interface of a system providing segment differentiating and comparison information to a marketer. FIG. 3 illustrates an "add audience comparison panel" option 31 in a user interface 30. The "add audience comparison panel" option 31 launches an audience comparison tool to compare the segments to better understand the significant differences and/or similarities between the segments. FIG. 4 illustrates the audience comparison panel 41 launched by the "add audience comparison panel" option 31 of FIG. 3. The audience comparison panel 41 prompts the marketer to add segments. FIG. 5 shows that the Silver Members segment has been added by the marketer dragging the Silver Member item 51 to the add a segment box 52. Based on this input, the system assumes that the marketer wants (absent further input) to compare the Silver Member segment with everyone else, i.e., everyone who is not in the Silver Members segment. Accordingly, the compare against box 53 is automatically populated with "Everyone Else." However, in this example, the marketer instead wants to compare against a Chrome or IE segment. Thus, FIG. 6 illustrates that the Chrome or IE segment has been added by the marketer dragging the Chrome or IE item 61 to the compare against box 62. Now the marketer is ready to run the comparison by selecting run comparison option 63.

Figure 7:
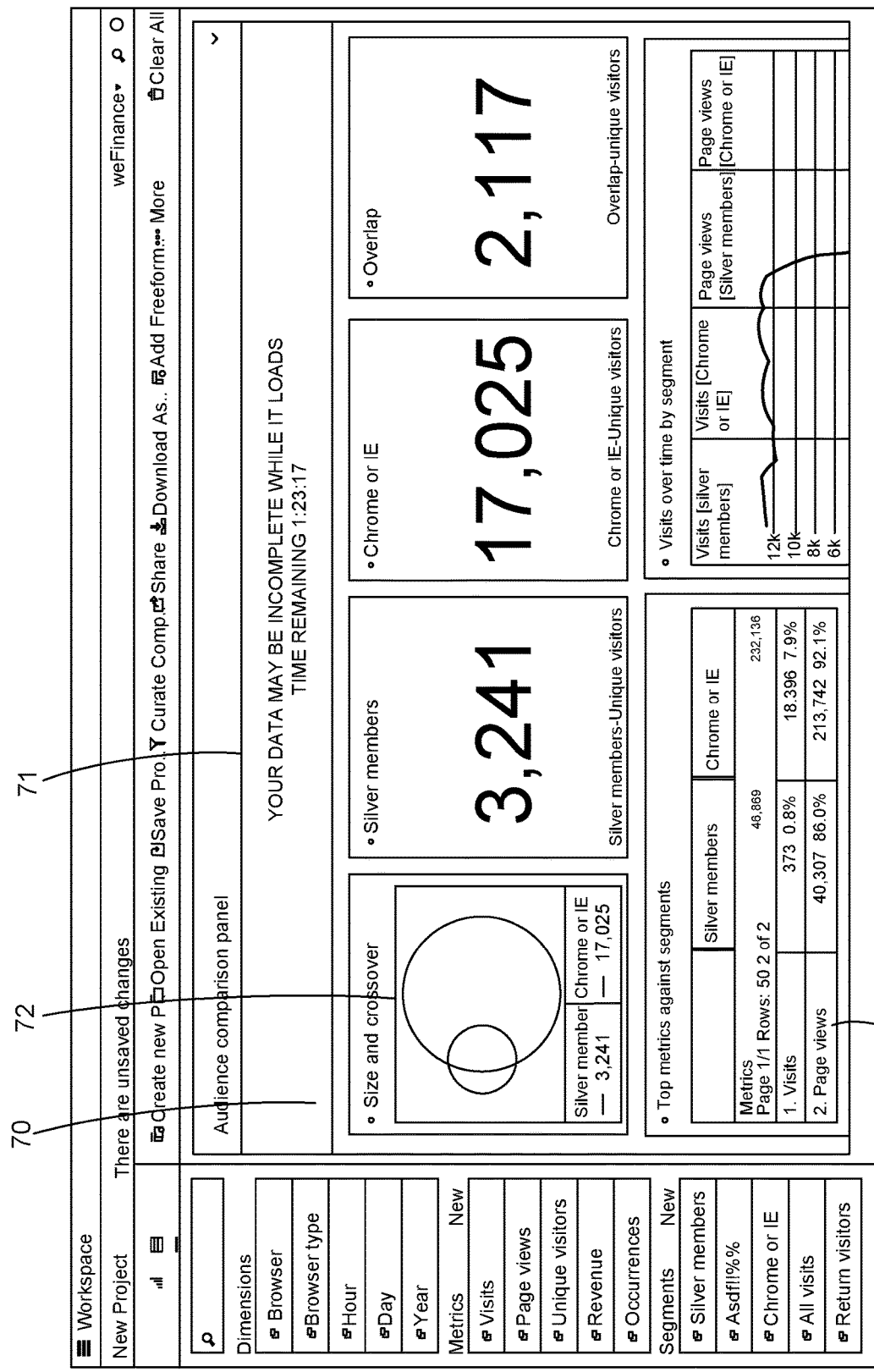
FIG. 7 illustrates an examples of a user interface of a system providing segment differentiating and comparison information to a marketer.

FIG. 7 illustrates the initial report 70 that is displayed as the comparison begins to run. The comparison continues to load/update as the data is compared. The report 70 starts building on-the-fly instead of waiting for all of the data analysis to be complete. There is a status bar 71 at the top of this report 70 showing how many dimensions, metrics, and segments are already inspected. With this approach, the marketer gains insight immediately rather than having to wait for all of the data to be processed. While the marketer waits for the report to finish loading, the marketer can see some interesting insights. In the top-left, a visualization 72 depicts the size and overlap of the two segments. This visualization 72 shows that some overlap exists between these two segments being compared, and that the Chrome or IE segment end users greatly outnumber the silver member segment end users. The report 70 further illustrates information about the most significant differences in comparison area 73. The results of report 70 are updated in a streaming fashion as new information is processed.

Figure 8:
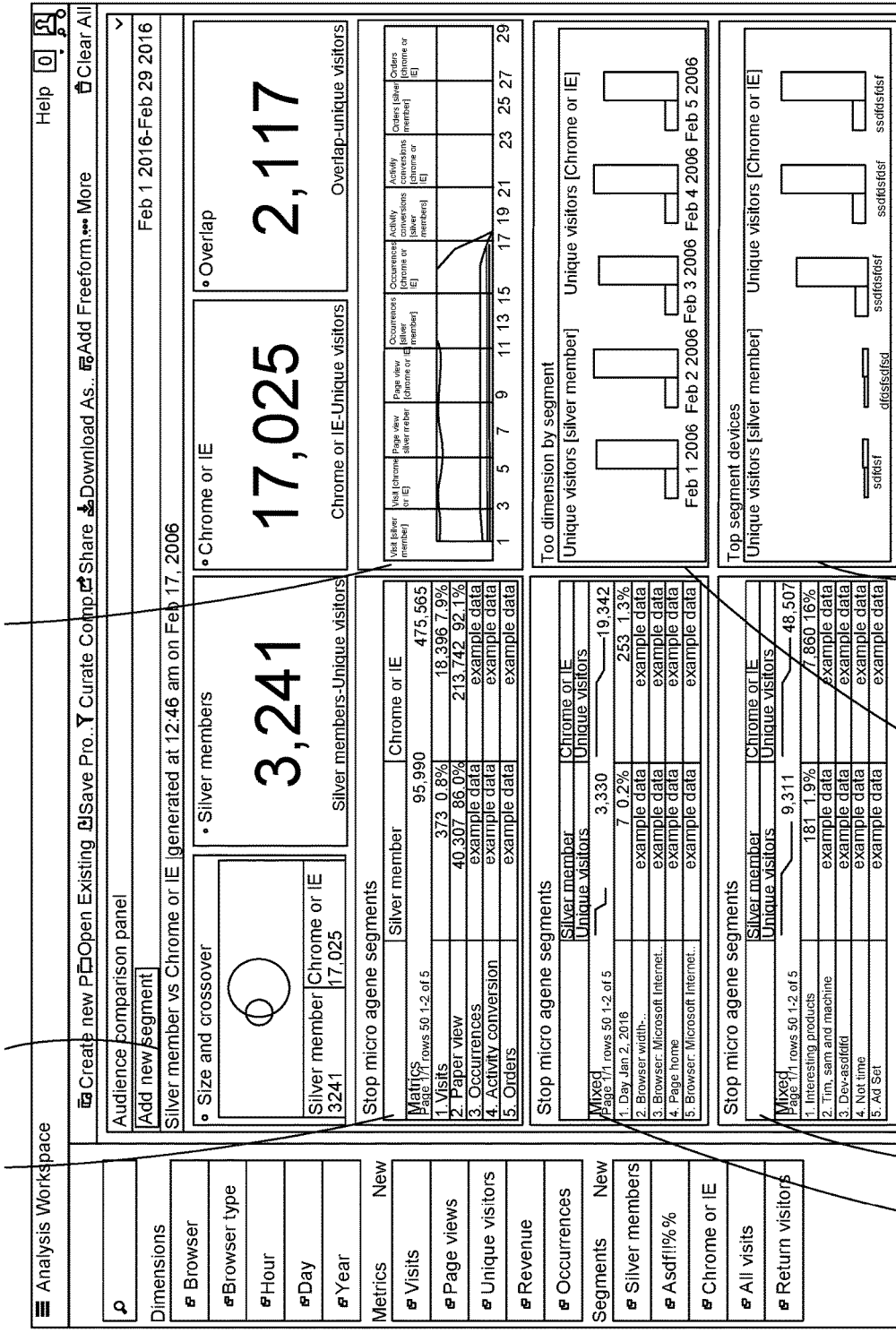
FIG. 8 illustrates an examples of a user interface of a system providing segment differentiating and comparison information to a marketer.

FIG. 8 shows the comparison report 80 following the completion of comparison of all metrics, dimensions, and other segments in the complete data set. The marketer can glean several insights from the report 80 in this example. Three key tables 81, 82, and 83 on the left-hand side highlight the top differences for metrics (table 81), dimensions (table 82), and other overlapping segments (table 83). In exemplary metrics chart 81, five metrics are identified with respect to which the segments differ most and information about each metric is provided, e.g., values, percentages, etc. In the exemplary dimensions chart 82, five dimensions are identified with respect to which the segments differ most and information about each dimension is provided. In the exemplary other segments overlap chart 83, five other segments are identified with respect which the compared segments overlaps differ most. Additional information is provided regarding the overlap with the other segments in the chart 83. In an alternative embodiment, one or more additional columns or values provided in charts 81, 82, 83, would identify a measure of magnitude of the difference between the metrics, dimensions, and other segment overlaps. The measure of magnitude could be determined by statistically comparing distributions of metric values and quantifying the differences between the distributions. The charts 84, 85, 86 on the right side of the report 80 provide more detailed information about selected entries in the corresponding tables 81, 82, 83.

In another example of a comparison of segments, a marketer runs a segment comparison to compare a high-income segment and a low income segment and the report identifies to following chart of top metric differences between the segments.

|  | High Income | Low Income | Difference Measure (0-10) |
|---|---|---|---|
| Loan Calculator Interactions | Average 2.4, click for distribution | Average 0.16, click for distribution | 8 |
| Revenue | Average 150, click for distribution | Average 132, click for distribution | 6.5 |
| Age | Average 49, click for distribution | Average 33, click for distribution | 6.1 |

In the above example, the differences between metrics are scored on a scale of 0-10 to facilitate comparison with one another and to provide an intuitive basis for the marketer to understand the relative differences between metrics. To provide such scores, statistical tests are used to compare metrics, e.g., averages, distributions, etc., with one another and the results of those statistical tests are converted into the standard scoring scale.

The above exemplary report shows the three metrics with respect to which the high income and low income segments differ most. From this report, the marketer is able to observe that the high-income segment interacts with an auto loan calculator far more than a lower-income segment. This distinction could have easily been overlooked absent the user interface identifying differences and presenting information about the most significant differences. Upon seeing this difference in this example, the marketer uses the user interface to follow up and drills down on metrics relating to the loan process to identify that high-income segment end users are often not making it from the auto loan calculator to an auto loan application and, in fact, are often not even starting the application process. Rather than letting these valuable end users slip through without a conversion, the marketer creates a trigger based on auto loan calculator usage for the high-income segment. When a high-income end user interacts with the auto loan calculator, the system automatically follows up with an email regarding providing the end user's next car loan. In this example, the marketer was able to quickly and easily identify and act upon a significant difference between the high income segment end users and the low income segment end users.

Figure 9:
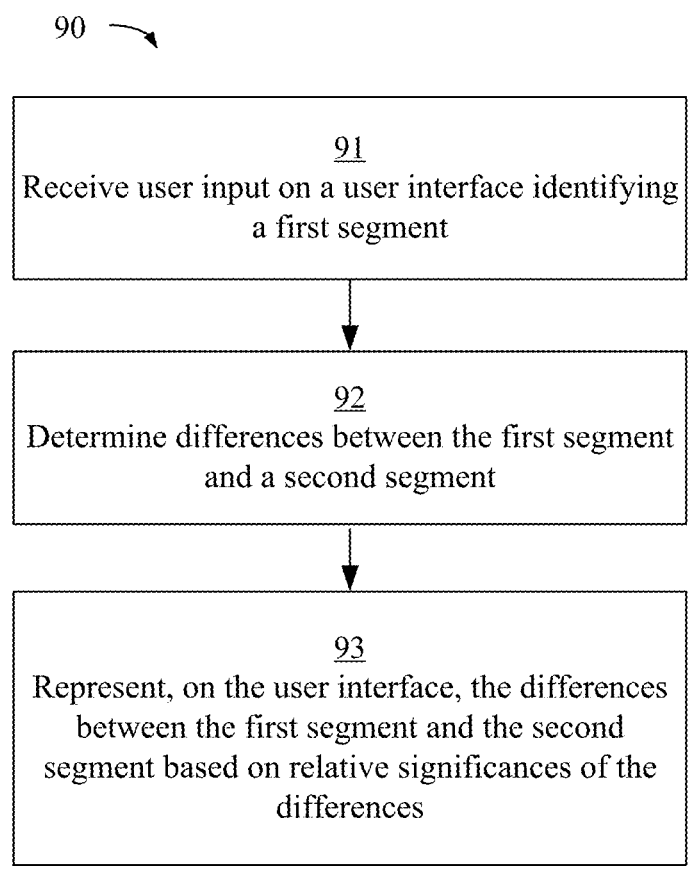
FIG. 9 is a flow chart illustrating an exemplary method for providing a user interface representing differences between segments of end users.

FIG. 9 is a flow chart illustrating an exemplary method 90 for providing a user interface representing differences between segments of end users. Exemplary method 90 is performed by one or more processors of one or more computing devices such as server 2 of FIG. 1. Method 90 involves receiving user input on a user interface identifying a first segment, as shown in block 91. The first segment comprises a subset of end users that have a particular characteristic. A second segment for comparison is also identified. In one example, user input on the user interface further identifies the second segment for comparison with the first segment. In another example, a second segment is automatically identified based on the first segment. In one example, the second segment that is automatically identified is a segment of all end users not in the first segment. In another example, segments are related, e.g., member status segments (gold, silver, bronze, etc.) and the second segment is automatically determined based on the relationship, e.g., selection of gold members as the first segment results in a default value of silver members for the second segment.

The method 90 further involves determining differences between the first segment and a second segment, as shown in block 92. The method 90 identifies differences in metrics, dimensions, and/or other segment overlap depending upon the implementation. In one embodiment of the invention, the method 90 identifies relative differences in metrics for the first segment and second segment by statistically comparing respective distributions of metrics for the first segment and the second segment. In one example, the method 90 statistically compares cumulative density functions representing data about the metrics of the first segment and metrics of the second segment.

The method 90 further involves representing, on the user interface, the differences between the first segment and the second segment based on relative significances of the differences, as shown in block 93. For example, the user interface can list the metrics, dimensions, and other segments and highlight ones having significant differences above a predefined or user-defined threshold. In another example, the user interface provides ranked lists of metrics, dimensions, and/or other segment overlap that are ranked based on amount of difference to identify those with significant differences. The user interface also provides information about the metrics and/or differences in one embodiment of the invention. In one example, this involves identifying relative differences in metrics for the first segment and second segment and representing relative amounts of the differences in the metrics on the user interface.

Embodiments of the invention, including but not limited to the method 90, of FIG. 9, provide techniques to determine and succinctly represent or rank the most relevant and/or significant differences between two audience segments, called A and B. Metrics and/or dimensions that are ranked higher are emphasized to the marketer. One embodiment of the invention further provides a statistically sound and efficient technique for determining differences between metrics and/or dimensions. In this embodiment, a p-value is used for an appropriately chosen statistical test to rank the metrics and dimensions. The null hypothesis of these tests is that A and B are the same along a metric or dimension d. The smaller the p-value is obtained, the more significant the evidence is that the null hypothesis should be rejected just by looking at the metric/dimension d alone, and hence A and B are more significantly different along d. This does not necessarily mean that rejection of the null hypothesis must be recommended. Using p-value to rank (smaller come first) is sufficient for the purpose of showing the marketer the differentiating metric/dimension first. For dimensions having discrete rather than ordered numerical values, a risk difference, risk ratio, Pearson's chi-squared test, and/or another appropriate technique is used in the analysis. For metrics of continuous ordered values, various techniques can be used. The discussion in the following paragraphs discusses several examples including examples for treating the circumstance in which two segments that are being compared with one another partially overlap. The techniques described can be generalized to more than two segment comparisons. Further complication might arise when these multiple segments overlap, but they can be treated in the same spirit as in the approaches discussed below.

Figure 10:
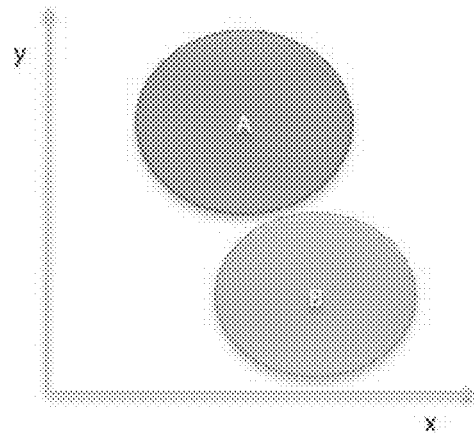
FIG. 10 is a graphical depiction of a statistical test used to distinguish two segments.
Figure 11:
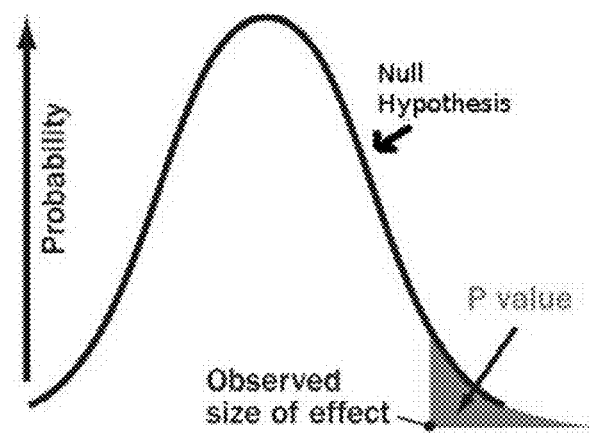
FIG. 11 is a graphical depiction of a statistical test used to distinguish two segments.
Figure 12:
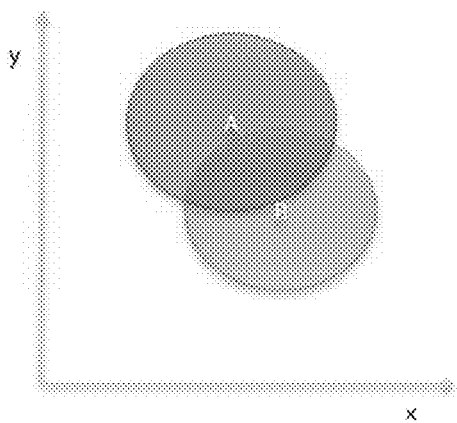
FIG. 12 is a graphical depiction of a statistical test used to distinguish two segments.

FIGS. 10-11 are graphical depictions of a statistical test used to distinguish two segments. In this example, the p-value under the null hypothesis that all segments are the same along dimension d is used to rank (the smaller the higher the rank) the dimensions. In this example, the p-value along dimension y should be smaller than the p-value along dimension x. In FIG. 12, two overlapping segments are shown with respect to dimension y and dimension x.

One embodiment of the invention provides for metric ranking in the circumstance of two non-overlapping segments. In this example, assume that A and B are two mutually exclusive sets of end users (B can be the complement of A, e.g., the segment of everything else but A). Along a metric d (e.g., revenue, pageviews, etc.), let the set of observations from the two segments is d(A) and d(B). In order to score the metric d for the purpose of ranking (which can be used to decide where or how to display in a user interface), the following procedure is used:
1. Form the null-hypothesis: observations in d(A) and d(B) are independent and come from the same distribution (although the distribution could be unknown)
2. With the null-hypothesis, calculate a test statistic t(d(A), d(B)). This type of test is known as a 2-sample test.
3. From the test statistic t, we compute the p-value p, and let pval(d)=p (smaller is better)

If pval(d) is sufficiently small, the null-hypothesis can be rejected that A and B are the same and conclude that A and B are different along the metric d. If pval(d) is large, the test did not find evidence to reject that A and B are the same along d. Hence it makes sense for the segment difference GUI to focus the users on metric with small pval(d) first. Note that this technique does not assume a priori a parametric form (e.g., Gaussian) for the observations arising from a given metric. Thus, non-parametric tests are employed. A range of non-parametric 2-sample tests can be used in step 2 of the procedure above: these include the Kolmogorov-Smirnov (KS) test, rank-based tests (e.g., the Mann-Whitney U-test) and the Anderson-Darling (AD) test. Rank-based tests are sensitive to location shifting and robust to noise, however they are insensitive to the shape of the distribution and can fail in the case when the two distributions are symmetric and have the same median. The KS test is widely used, but note that their extension to the k-sample case, $k \geq 3$ is highly non-trivial. The AD test has the benefit that extension to 3 samples or more is straightforward. However, all of these tests are adequate for the case of 2 non-overlapping segments.

Metric ranking is also determined in the circumstance of two overlapping segments. When the two segments of end users A and B overlap, the observations in d(A) and d(B) are partially duplicated since they both contain d(A∩B), the observations from the intersection of A and B. For this reason, step 1 in the above algorithm does not apply. The techniques used to compare the segments account for segment overlap in various ways, including but not limited to, using a randomized separation or striping technique and using a three sample test, depending upon the implementation. Both approaches apply to situations where the continuous metric test (KS, MW, AD) is used or a 2-test is used for discrete dimension.

The randomized separation or striping technique allows for a statistical comparison of subsets of the data that are large enough to provide statistically meaningful results while also selected in a way that guarantees that there is no overlap. In one example, there are two segments A and B that overlap. The technique randomly assigns to each end user a category, e.g., red and blue. Next, the technique selects, only red end users as s subset of segment A and only blue end users for a subset of segment B. Doing so ensures that none as the end users from segment A subset are the same as the end users from segment B subset. Because they are assigned randomly and the data set is sufficiently large, the statistical analysis still provides statistically meaningful results. In this way, a comparison can be performed on non-overlapping subsets to provide a measure of difference between two segments.

The following provides a more specific example of the randomized separation or striping technique. In this technique, the whole population of A and B is split into two non-overlapping sets, C1 and C2. The technique then takes A0=A\C1 and B0=B\C2. The statistics of A0 and B0 remain the same as that of A and B, albeit the sample size is halved. More importantly, A0 and B0 do not overlap: hence the technique then applies the statistical tests for non-overlapping segments to A0 and B0. The following algorithm can be used:
1. Randomly assign each individual in A∪B into two non-overlapping sets $C_1$ and $C_2$. If individual id has been assigned randomly, then $C_1$ can be the individuals with odd ids, and $C_2$ the set of individual with even ids.
2. Form the new sub-sampled segments A'=A∩$C_1$, B'=B∩$C_2$. This effectively split the visitors in A∩B into two parts, one in A' and the other in B'.
3. Calculate the 2-sample test statistic t(d(A'), d(B')).

4. From the test statistic t, we compute the p-value ρ

Figure 13:
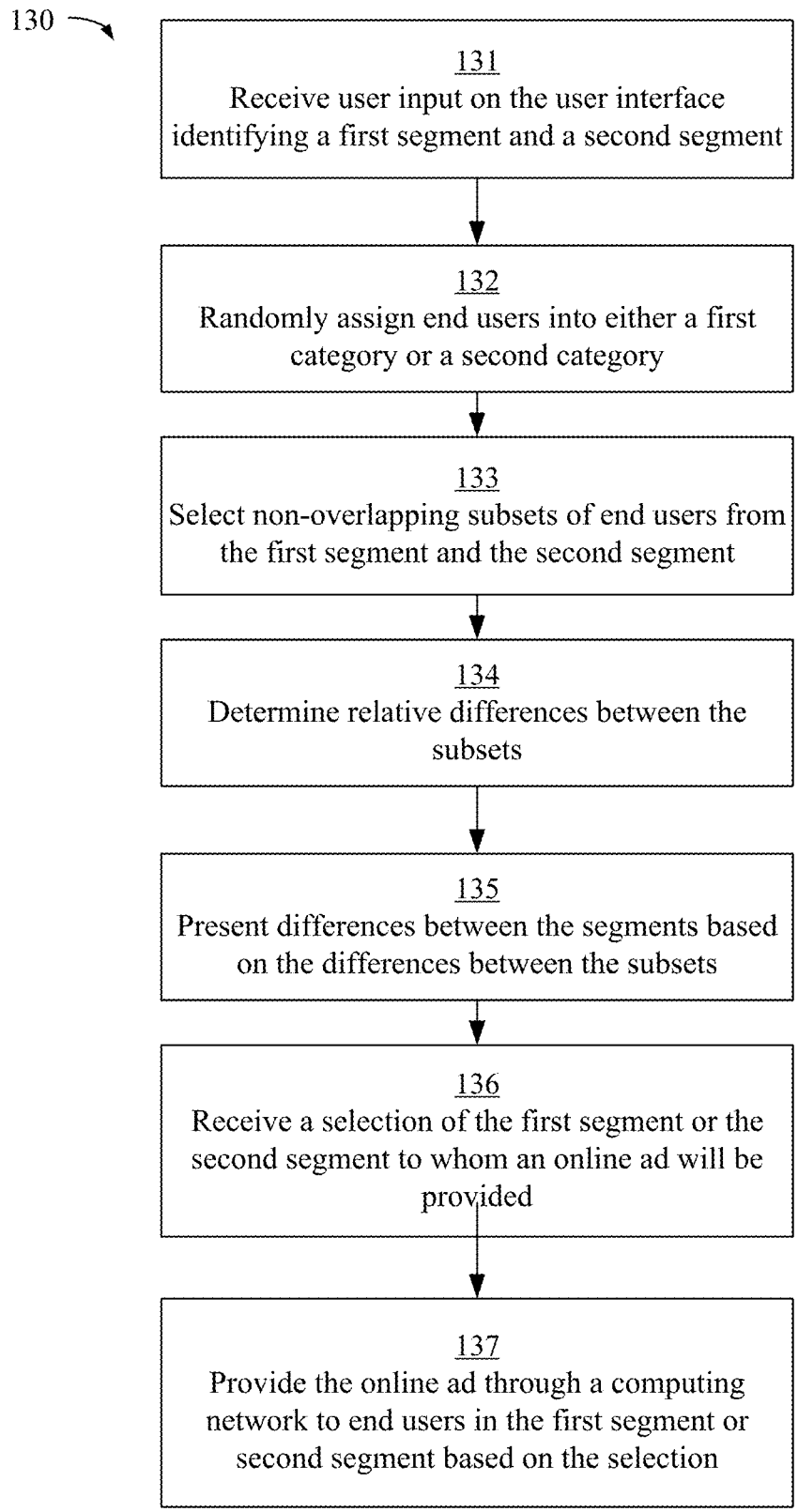
FIG. 13 is a flow chart illustrating an exemplary method for providing an online ad through a computing network segment selection on a user interface that distinguishes overlapping segments.

FIG. 13 is a flow chart illustrating an exemplary method 130 for providing an online ad through a computing network segment selection on a user interface that distinguishes overlapping segments via the randomized separation technique. Exemplary method 130 is performed by one or more processors of one or more computing devices such as server 2 of FIG. 1.

Method 130 receives user input on a user interface identifying a first segment and a second segment, as shown in block 131. The first segment and the second segment comprise subsets of the end users having respective characteristics. The user input involves a user selecting the first segment and the second segment being automatically selected based on the first segment's selection, in one example. In another example, the user independently chooses two different segments for comparison, for example, by dragging icons of the respective segments to positions on a comparison panel.

Method 130 further involves randomly assigning end users into either a first category or a second category, as shown in block 132. Non-overlapping subsets of end users are selected from the first segment and the second segment by selecting a first subset of first segment end users in the first category and selecting a second subset of second segment end users in the second category, as shown in block 133. The method 130 further involves determining relative differences between the subsets, as show in block 134, and presenting on the user interface differences between the segments based on the differences between the subsets, as shown in block 135. The method 130 further involves receiving a selection of the first segment or the second segment to whom an online ad will be provided, as shown in block 136, and providing the online ad through a computing network to end users in the first segment or second segment based on the selection, as shown in block 137.

The three-sample technique is another way of addressing segment overlap. In one example, relative differences in metrics for the first segment and second segment are identified using a three sample statistical test. In a three sample test technique, three sample populations are used A and B, A-B, and B-A. The technique assumes that the samples are statistically the same and thus if the null hypothesis is not true, then one must be different. If the result says that there is a difference, then a follow up process is used to determine which one is different. When a 3-sample approach is used, for continuous metric, a 3-sample AD test is likely the best choice since the 3-sample extension for KS is highly nontrivial. The following algorithm can be used:
1. Form the null-hypothesis: observations in d(A\B) and d(A\B) and d(A∩B) are independent and come from the same distribution.
2. Calculate the 3-sample test statistic t(d(A\B), d(B\A), d(A∩B)).
3. From the test statistic t, we compute the p-value ρ, and let pval(d)=ρ (smaller is better)

The pval(d) is used to rank metrics. If pval(d) is sufficiently small, the null-hypothesis can be rejected that A\B, B\A, and A∩B are the same and conclude that at least one of them must be different along the metric d. However, the test will not tell which one is different. Hence, when pval(d) is small, the technique recommends running three additional 2-sample tests with the null-hypothesis (perhaps not automatically but only when the marketer requests it):
d(A\B) and d(A∩B) are the same
d(A\B) and d(A∩B) are the same
d(A\B) and d(B\A) are the same and report the three p-values accordingly.

One counter-intuitive case is when the population in the overlapping intersection (A∩B) are different while the other two sub-segments are the same. Although one can argue that the two segments A and B are the same (along the metric d), the test(s) in fact have discovered something interesting about the overlapping segment, and hence using small pval(d) to guide the focus is still reasonable.

k-Sample Anderson Darling Test

One embodiment of the invention uses a k-sample Anderson Darling (AD) test. The k-sample AD test is described in the paper "K-Sample Anderson-Darling Tests," F. W. Scholz and M. A. Stephens, Journal of the American Statistical Association, Vol. 82, No. 399 (September, 1987), pp. 918-924. The exemplary embodiment uses k samples (segments/sub-segments), sample i has m observations. The pooled sample, defined as all the samples grouped together, has size $N=n_1+\ldots n_k$. There are L distinct observations in the pooled sample, ordered $Z_i^* < \ldots < Z_L^*$. For example, in case of revenue there could be $N=10^6$ end users, $L=10^4$ distinct revenue values, with $Z_i^*=0$ and $Z_L^*=500(\$)$.

The null-hypothesis states that all the observations from the k samples are i.i.d. drawn from the same distribution. To calculate the AD statistic, the technique counts how many observations from each sample coincide with each of the distinct values $Z_j^*$ in the pooled set. Let $f_{ij}$ be the number of observations in the ith sample having value $Z_j^*$, and let $l_j=f_{ij}+\ldots+f_{kj}$ be the total counts of the $Z_j^*$ in all k samples. Let $M_{ij}=f_{i1}+\ldots+f_{ij}$ be the cumulative counts of the sample i and $B_j=l_1+\ldots+l_j$ be the cumulative counts of the pooled sample. The AD test statistic is defined as follows:

$$A_{kN}^2 = \sum_{i=1}^{k} \frac{1}{n_i} \sum_{j=1}^{L-1} \frac{l_j}{N} \frac{(NM_{ij}-n_iB_j)^2}{B_j(N-B_j)}$$

which is the same as $$A_{kN}^2 = \sum_{i=1}^{k} n_i \sum_{j=1}^{L-1} \frac{l_j}{N} \frac{(N(M_{ij}/n_i)-B_j)^2}{B_j(N-B_j)}$$

The pooled sample $Z_1^* \ldots Z_L^*$ together with their counts $l_1+\ldots+l_L$ and the cumulative counts $B_1 \ldots B_L$ are obtained from a query engine in one embodiment by treating the d-metric values as the keys. For each sample i, the sample-specific cumulative counts $M_{i1} \ldots M_{iL}$ can be obtained similarly from the query engine with a sample-specific query. Evaluating the inner summation which combines three "columns" $l_{1:L}$, $B_{1:L}$ and $1/n_i \, M_{i1:iL}$ $$\sum_{j=1}^{L-1} \frac{l_j}{N} \frac{(N(M_{ij}/n_i)-B_j)^2}{B_j(N-B_j)}$$

has complexity O(L) and is probably the most expensive operation. If the equation can be evaluated with a query engine query then this would be the most efficient implementation. If not, there is the communication cost of having to send columns of size L outside the query engine. The equation must be evaluated k times, and each time the only column that changes is $/n_i\, M_{i1:iL}$.

Once the test statistic $A^2_{kN}$ is obtained, the calculation of p-value can be outside of the query engine without incurring any communication cost. When the underlying distribution of the metric observation is continuous, the asymptotic distribution $A^2_{kN}$ converges in distribution to:

$$A^2_{k-1} = \sum_{j=1}^{\infty} \frac{1}{j(j+1)} Y_j$$

Where $Y_j$ are independent $\chi 2$-distributed random variables with degree of freedom k−1. The ad.test R-method in the kSample package recommends use "asymptotic" p-value when all sample size $n_i>4$. The method ad.pval(tx, m, version) contains a reference implementation of how to compute p-value. Here tx is the calculated statistic, m=k−1, and the statistic in the equation is the version 1 AD statistic (so version=1). This method for computing p-value works for arbitrary k via interpolation (p-value are precomputed for a small number of values of k, and then interpolation is used for the rest).

One subtle issue is the condition that the underlying distribution of the metric is continuous for the asymptotic of $A^2_{kN}$ to be given by the equation. The equation is still a good approximation when the discretization is not too drastic. In this example, a large portion of the population might have the metric value equal to 0, this can potentially violate the condition for the asymptotic form. If there is an effect on accuracy of the p-value calculation, there are several solutions to resolve the issue, for example, isolating the population with zero metric value.

Figure 14:
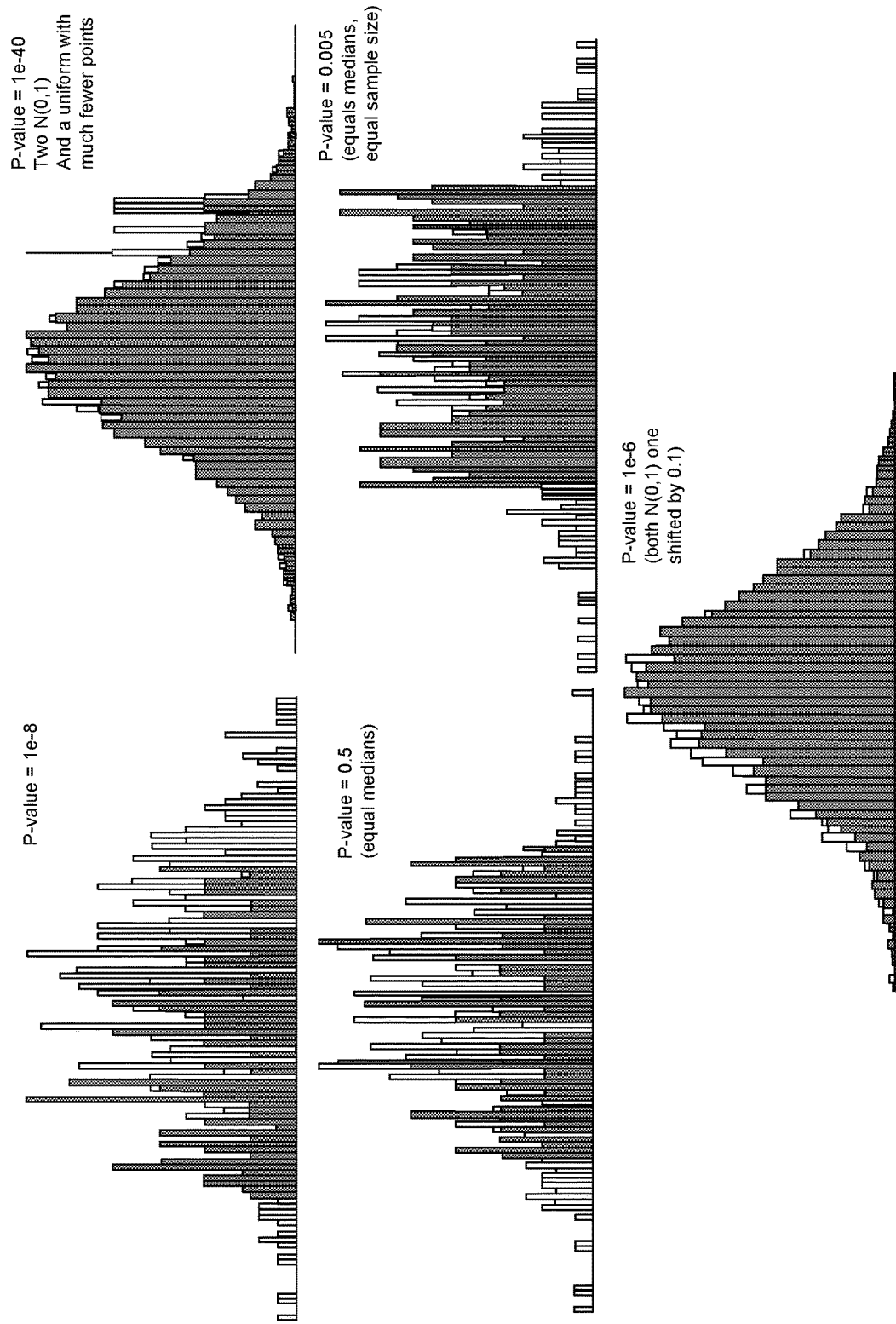
FIG. 14 illustrates graphs depicting example AD test p-values.

FIG. 14 illustrates example samples and AD test p-values.
Implementation of Statistical Tests—Exploited Particularities of Architecture One embodiment of the invention achieves efficiency by exploiting particularities of the query engine architecture. Query engines used to retrieve segment information from large volumes of end user data will organize stored data and provide retrieved data in various formats. One example query engine is highly optimized for aggregating vast amounts of information in very specific ways, e.g., to be very efficient at retrieving information showing how much revenue particular products have. The statistical test(s) employed by an embodiment of the invention to compare segments can be selected and implemented in a way that takes advantage of the particular query engine architecture and environment. In one example, a query engine provides information using a cumulative density function and the techniques used to compare segments are customized to take advantage of that. Accordingly, one embodiment of the invention compares segments efficiently using cumulative density functions of aggregate statistics and uses particular statistical tests on that information. Similarly, if the query engine uses binning, e.g., for revenue, from a minimum to a maximum, and such information is pre-calculated and stored already, the statistical tests used to compare segments can leverage this information. In one example, the query engine system is a system that produces aggregate statistics in a cumulative density function with hyper-optimized primitives. In this example, the segment comparison technique is implemented to take advantage of the primitives that are available and thus process more efficiently.

Sampling to Speed Up the Segment Comparison User Interface

One embodiment of the invention provides systems and methods for providing a user interface that more quickly presents significant differences between segments of end users. In certain implementations, data volumes will be very large and processing a complete comparison of segments before providing results is undesirable. One embodiment of the invention addresses such circumstances by providing preliminary results on a user interface for the most relevant segment differences prior to completing processing of a complete data collection. The technique quickly identifies any metrics, dimensions, and other segments that are highly different for the segments without necessarily analyzing the entire data collection. In one particular example, a segment comparison involves pulling data from multiple servers. A report is run on a subset of the available revenue data (e.g., data available on a single computing device) and finds that revenue is highly different in the subset for the segments. The user interface uses this information to determine that revenue is a significant difference and runs a revenue segment comparison using the complete data set. The technique quickly identifies that revenue is important based on samplings a uniformly distributed sample of end user data. This sampling, in one example, is performed simultaneously on different subsets for different metrics, dimensions, or other segment overlap to identify those that are most different so that complete data for the most different ones can be analyzed and reported on first.

Querying the complete data set for all metrics, dimensions, and other segment overlaps is not necessary prior to presenting results for the most different ones. The efficiency achieved by such sampling and selective processing is particularly significant in the context of very large volumes of data, e.g., those involves millions, tens of millions, or even hundreds of millions or more end users and hundreds or thousands or more data items for the end users. The preliminary results can be very important to an analyst who may be in a circumstance in which a strategic marketing decision must be made more quickly than processing of the complete data set for all aspects would allow.

Figure 15:
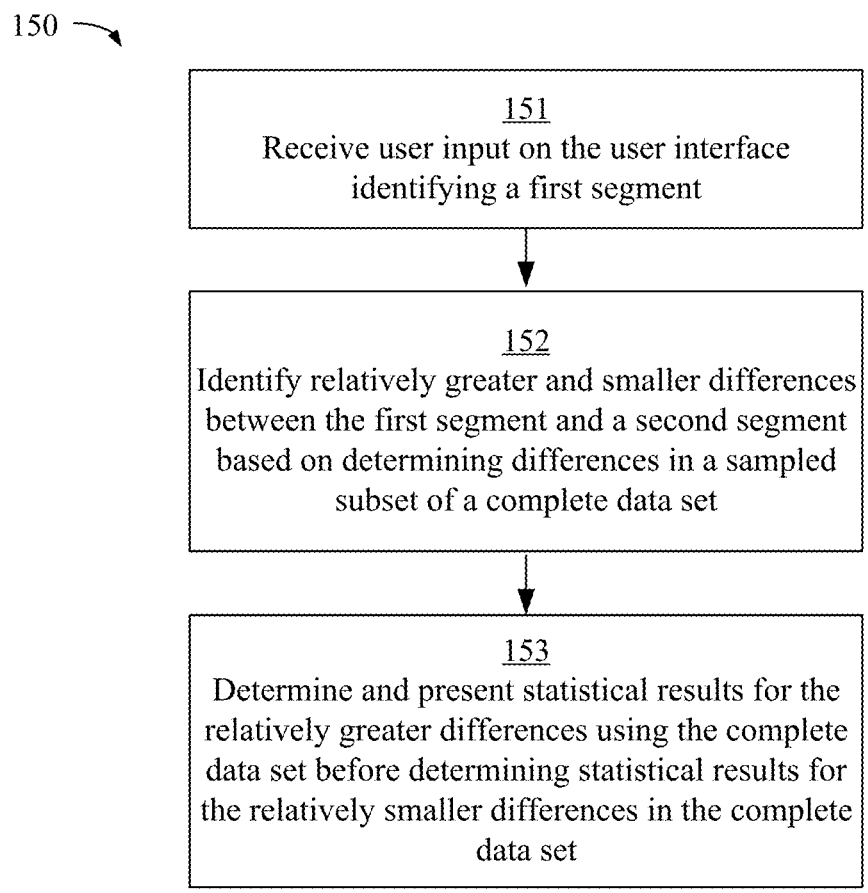
FIG. 15 is a flow chart illustrating an exemplary method for providing a user interface representing differences between segments of end users.

FIG. 15 is a flow chart illustrating an exemplary method 150 for providing a user interface representing differences between segments of end users. Exemplary method 150 is performed by one or more processors of one or more computing devices such as server 2 of FIG. 1. Method 150 involves receiving user input on the user interface identifying a first segment, as shown in block 151. The first segment has a subset of the end users having a particular characteristic. The method 150 further involves identifying relatively greater differences and relatively smaller differences between the first segment and a second segment based on determining differences in a sampled subset of a complete data set, as shown in block 152. The method 151 further involves determining and presenting statistical results for the relatively greater differences using the complete data set before determining statistical results for the relatively smaller differences in the complete data set. In one example, the statistical results for the relatively greater differences identify difference scores for metrics, dimensions, and/or other segment overlap that differ most significantly between the first segment and the second segment.

Exemplary Computing Environment

Figure 16:
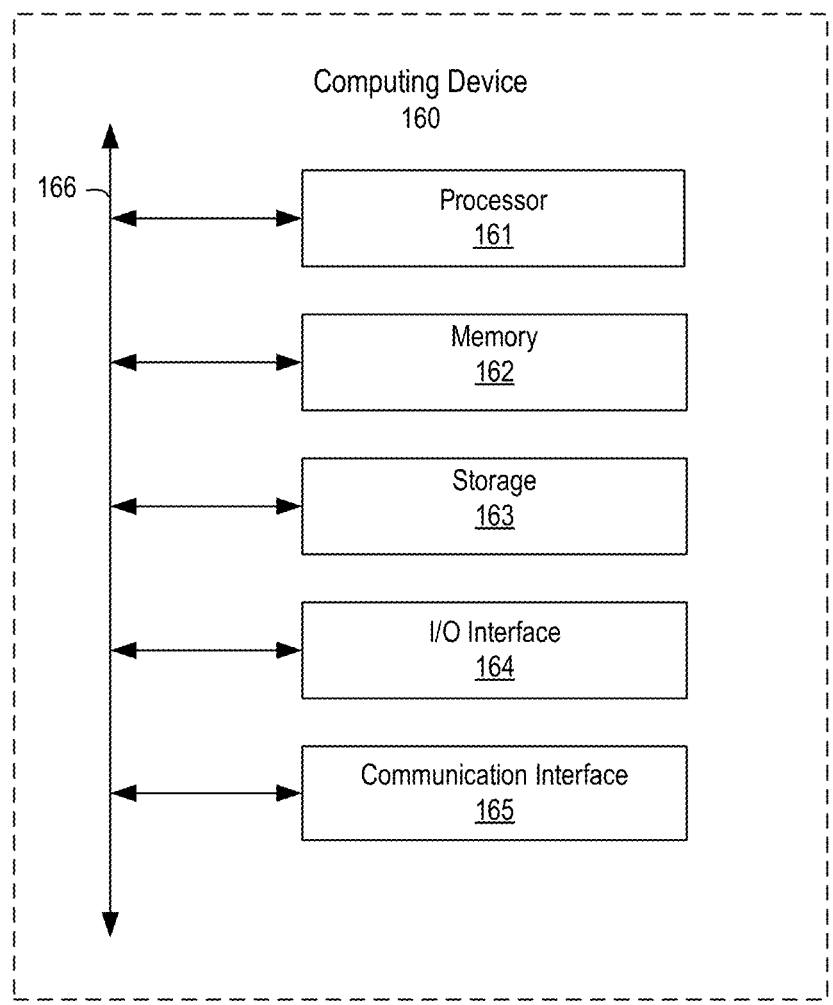
FIG. 16 is a block diagram depicting an example hardware implementation.

Any suitable computing system or group of computing systems can be used to implement the techniques and methods disclosed herein. For example, FIG. 16 is a block diagram depicting examples of implementations of such components. The computing device 160 can include a processor 161 that is communicatively coupled to a memory 162 and that executes computer-executable program code and/or accesses information stored in memory 162 or storage 163. The processor 161 may comprise a microprocessor, an application-specific integrated circuit ("ASIC"), a state machine, or other processing device. The processor 161 can include one processing device or more than one processing device. Such a processor can include or may be in communication with a computer-readable medium storing instructions that, when executed by the processor 161, cause the processor to perform the operations described herein.

The memory 162 and storage 163 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C #, Visual Basic, Java, Python, Perl, JavaScript, and ActionScript.

The computing device 160 may also comprise a number of external or internal devices such as input or output devices. For example, the computing device is shown with an input/output ("I/O") interface 164 that can receive input from input devices or provide output to output devices. A communication interface 165 may also be included in the computing device 160 and can include any device or group of devices suitable for establishing a wired or wireless data connection to one or more data networks. Non-limiting examples of the communication interface 165 include an Ethernet network adapter, a modem, and/or the like. The computing device 160 can transmit messages as electronic or optical signals via the communication interface 165. A bus 166 can also be included to communicatively couple one or more components of the computing device 160.

The computing device 160 can execute program code that configures the processor 161 to perform one or more of the operations described above. The program code can include one or more modules. The program code may be resident in the memory 162, storage 163, or any suitable computer-readable medium and may be executed by the processor 161 or any other suitable processor. In some embodiments, modules can be resident in the memory 162. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A computer-implemented method for providing a user interface representing differences between segments of end users, the method comprising:
   receiving user input on the user interface indicating a selection of a first segment and a second segment, wherein the first segment comprises a subset of end users and the second segment comprises another subset of the end users;
   randomly assigning the end users into either a first category or a second category by assigning each of the end users an identifier (ID) randomly, placing each of the end users having the ID that is odd into the first category, and placing each of the end users having the ID that is even into the second category;
   selecting non-overlapping subsets of the end users from the first segment and the second segment by selecting a first subset of the first segment of the end users in the first category and selecting a second subset of the second segment of the end users in the second category;
   identifying metrics and dimensions for the first segment and for the second segment;

identifying common metrics between the first segment and the second segment from the metrics, and identifying common dimensions between the first segment and the second segment from the dimensions;

identifying common metrics between the first subset of the first segment and the second subset of the second segment;

identifying common dimensions between the first subset of the first segment and the second subset of the second segment;

comparing the common metrics and the common dimensions to identify a subset of the common metrics and a subset of the common dimensions with a largest relative statistical difference using a three sample statistical test, wherein:

the comparing includes identifying the largest relative statistical difference in the common metrics and the largest relative statistical difference in the common dimensions for the first segment and the second segment by comparing respective distributions of the common metrics and the common dimensions for the first subset and the second subset using the three sample statistical test, and the three sample statistical test includes forming a null-hypothesis, calculating a 3-sample test statistic, and computing a p-value from the 3-sample test statistic;

determining an order of the identified subset of the common metrics and the identified subset of the common dimensions such that those having a smaller p-value appear higher in the order; and representing, on the user interface, the identified subset of the common metrics between the first segment and the second segment having the largest relative statistical differences and the identified subset of the common dimensions between the first segment and the second segment having the largest relative statistical differences according to the determined order.

2. The method of claim 1 further comprising representing, on the user interface prior to completion of the comparison, preliminary results of the identified subset of the common metrics between the first segment and the second segment having the largest relative statistical difference and preliminary results of the identified subset of the common dimensions between the first segment and the second segment having the largest relative statistical differences based on a sampling of data from the first segment and the second segment.

3. The method of claim 1 further comprising ordering the identified subset of the common metrics and the identified subset of common dimensions on the user interface in an order determined based on the relative statistical differences.

4. The method of claim 1 further comprising providing an online ad through a computing network to the subset of end users in the first segment, wherein the online ad is targeted to the end users in the first segment.

5. The method of claim 1 wherein the second segment is for all end users that are not in the first segment.

6. A computer program product for providing a user interface representing differences between segments of end users, said computer program product comprising:

a non-transitory computer-readable storage medium comprising program instructions executable by a computer, the program instructions comprising:

first instructions to receive user input on the user interface indicating a selection of a first segment and a second segment from the segments, wherein the first segment comprises a subset of the end users and the second segment comprises another subset of the end users;

second instructions to randomly assign the end users into either a first category or a second category, wherein the randomly assigning comprises assigning each of the end users an identifier (ID) randomly, placing each of the end users having the ID that is odd into the first category, and placing each of the end users having the ID that is even into the second category;

third instructions to select non-overlapping subsets of the end users from the first segment and the second segment by selecting a first subset of the first segment of the end users in the first category and selecting a second subset of the second segment of the end users in the second category;

fourth instructions to identify metrics and dimensions for the first segment and for the second segment;

fifth instructions to identify common metrics between the first segment and the second segment from the metrics, and identify common dimensions between the first segment and the second segment from the dimensions;

sixth instructions to identify common metrics between the first subset of the first segment and the second subset of the second segment;

seventh instructions to identify common dimensions between the first subset of the first segment and the second subset of the second segment;

eighth instructions to compare the common metrics and the common dimensions to identify a subset of the common metrics and a subset of the common dimensions with a largest relative statistical difference using a three sample statistical test, wherein:

the compare includes identifying the largest relative statistical difference in the common metrics and the largest relative statistical difference in the common dimensions for the first segment and the second segment by comparing respective distributions of the common metrics and the common dimensions for the first subset and the second subset using the three sample statistical test, and the three sample statistical test includes forming a null-hypothesis, calculating a 3-sample test statistic, and computing a p-value from the 3-sample test statistic; and ninth instructions to represent, on the user interface, the identified subset of the common metrics between the first segment and the second segment having the largest relative statistical differences and the identified subset of the common dimensions between the first segment and the second segment having the largest relative statistical differences.

7. The computer program product of claim 6, wherein the program instructions further comprise:

tenth instructions to represent, on the user interface prior to completion of the comparison, preliminary results of the identified subset of the common metrics between the first segment and the second segment having the largest relative statistical difference and preliminary results of the identified subset of the common dimensions between the first segment and the second segment having the largest relative statistical differences based on a sampling of data from the first segment and the second segment.

8. The computer program product of claim 6, wherein the program instructions further comprise:

tenth instructions to order the identified subset of the common metrics and the identified subset of common dimensions on the user interface in an order determined based on the relative statistical differences.

9. A system for providing a user interface representing differences between segments of end users, the system comprising:
at least one memory including instructions; and
at least one processor that is operably coupled to the at least one memory and that is arranged and configured to execute the instructions that, when executed, cause the at least one processor to:
receive user input on the user interface indicating a selection of a first segment and a second segment, wherein the first segment comprises a subset of end users and the second segment comprises another subset of the end users;
randomly assign the end users into either a first category or a second category;
select non-overlapping subsets of the end users from the first segment and the second segment by selecting a first subset of the first segment of the end users in the first category and selecting a second subset of the second segment of the end users in the second category;
identify metrics and dimensions for the first segment and for the second segment;
identify common metrics between the first segment and the second segment from the metrics, and identify common dimensions between the first segment and the second segment from the dimensions;
identify common metrics between the first subset of the first segment and the second subset of the second segment;
identify common dimensions between the first subset of the first segment and the second subset of the second segment;
compare the common metrics and the common dimensions to identify a subset of the common metrics and a subset of the common dimensions with a largest relative statistical difference using a two sample statistical test, wherein:
the compare includes identifying the largest relative statistical difference in the common metrics and the largest relative statistical difference in the common dimensions for the first segment and the second segment by comparing respective distributions of the common metrics and the common dimensions for the first subset and the second subset using the two sample statistical test, and
the two sample statistical test includes forming a null-hypothesis, calculating a 2-sample test statistic, and computing a p-value from the 2-sample test statistic;
determining an order of the identified subset of the common metrics and the identified subset of the common dimensions such that those having a smaller p-value appear higher in the order; and
represent, on the user interface, the identified subset of the common metrics between the first segment and the second segment having the largest relative statistical differences and the identified subset of the common dimensions between the first segment and the second segment having the largest relative statistical differences according to the determined order.

10. The system of claim 9 further comprising instructions that, when executed by at least one processor, are configured to cause the at least one processor to:
represent, on the user interface prior to completion of the comparison, preliminary results of the identified subset of the common metrics between the first segment and the second segment having the largest relative statistical difference and preliminary results of the identified subset of the common dimensions between the first segment and the second segment having the largest relative statistical differences based on a sampling of data from the first segment and the second segment.

11. The system of claim 9 further comprising instructions that, when executed by at least one processor, are configured to cause the at least one processor to:
order the identified subset of the common metrics and the identified subset of common dimensions on the user interface in an order determined based on the relative statistical differences.

12. The method of claim 1 wherein the representing comprises displaying a common metric of the identified subset of common metrics highest in the order first in a first list among the identified subset of common metrics and displaying a common dimension of the identified subset of dimensions highest in the order first in a second list among the identified subset of common dimensions.

* * * * *